UNITED STATES PATENT OFFICE.

WOOLSEY McA. JOHNSON, OF IOLA, KANSAS.

METHOD OF TREATING NICKEL-COPPER MATTE.

No. 825,056.      Specification of Letters Patent.      Patented July 3, 1906.

Application filed September 30, 1903. Serial No. 175,189.

*To all whom it may concern:*

Be it known that I, WOOLSEY MCA. JOHNSON, a citizen of the United States, residing at Iola, in the county of Allen and State of Kansas, have invented certain new and useful Improvements in Methods of Treating Nickel-Copper Matte, of which the following is a specification.

This invention is a method of treating nickel-copper matte for the purpose of separating therefrom some or all of the contained metals in commercially available form. The method will be described by reference to one specific example thereof.

The copper-nickel matte in the specific example to be described may contain thirty-nine per cent. of nickel, thirty-nine per cent. of copper, substantially one per cent. each of iron and cobalt, and twenty per cent. of sulfur, together with small proportions of platinum and palladium. This matte is crushed, ground to eighty mesh, placed in dissolving or leaching vats of any suitable construction, preferably provided with agitators, and subjected therein to the action of a heated solution of hydrochloric acid, preferably of about ten per cent. concentration and preferably maintained at a temperature approximating 100° centigrade. The leaching-vats may be provided with any suitable means for heating the acid solution and are preferably covered and provided with means for conducting away the sulfureted hydrogen formed by reaction of the acid upon the sulfids of the matte. The solution thus obtained contains nickel, cobalt, and iron as chlorids. Said solution is freed from cobalt and iron, preferably by treatment with chlorin and sodium carbonate or by the action of hypochlorites, according to known methods. The cobalt is recovered from the precipitate as oxid ($Co_3O_4$) and may be sold as such.

The residual nickel-chlorid solution is concentrated, if necessary, brought to neutrality or to a faintly acid reaction, and electrolyzed with insoluble anodes, the solution being preferably maintained during the electrolysis at a temperature of about 65° centigrade. Nickel is thereby precipitated in reguline form, and the evolved chlorin is utilized for the manufacture of bleaching-powder or otherwise.

The residue from the above-described acid treatment may contain seventy-five per cent. of copper, five per cent. of nickel, and some twenty per cent. of sulfur. Said residue is subjected to an oxidizing fusion in a reverberatory furnace, and thereby converted into blister copper, the nickel being slagged off and retreated in a small blast-furnace. The blister copper is poured hot into refining-furnaces and therein brought to "set" copper, carrying 0.3 to one per cent. of nickel. This is then cast into anodes and electrolytically refined to produce cathode copper of 99.94 per cent. purity, the precious metal slimes being treated in any approved manner. The nickel salts accumulating in the acid electrolyte are periodically separated therefrom and partially purified from copper by repeated fractional crystallization, the last traces of copper being separated by electrolysis and the nickel salts crystallized for platers' use.

I claim—

1. The herein-described method of recovering nickel and copper from matte, which consists in treating the matte with hydrochloric acid, thereby obtaining a solution rich in nickel and a residue rich in copper, electrolytically separating the nickel from said solution, and electrolytically separating the copper from said residue, substantially as described.

2. The herein-described method of recovering nickel and copper from matte, which consists in treating the matte with hydrochloric acid and electrolytically precipitating the nickel from the resulting solution, converting the residue into anodes rich in copper and electrolytically refining them, substantially as described.

3. The herein-described method of recovering nickel and copper from matte, which consists in treating the matte with heated dilute hydrochloric acid and electrolytically precipitating the nickel from the resulting solution, converting the residue into anodes rich in copper and electrolytically refining them, substantially as described.

4. The herein-described method of recovering nickel and copper from matte, which consists in treating the matte with heated dilute hydrochloric acid, separating the iron and electrolytically precipitating the nickel from the resulting solution, converting the residue into anodes rich in copper, and electrolytically refining them, substantially as described.

5. The herein-described method of recovering nickel and copper from matte, which consists in treating the matte with hydrochloric acid, electrolytically precipitating the nickel from the resulting solution, converting the residue into anodes rich in copper and electrolytically refining them, and recovering the nickel salts from the refining solution, substantially as described.

6. The herein-described method of recovering nickel and copper from matte, which consists in treating the matte with heated dilute hydrochloric acid, separating the iron and electrolytically precipitating the nickel from the resulting solution, converting the residue into anodes rich in copper and electrolytically refining them, and recovering the nickel salts from the refining solution, substantially as described.

In testimony whereof I affix my signature in presence of two witnesses.

WOOLSEY McA. JOHNSON.

Witnesses:
CHARLES M. STARKWEATHER.
JOHN FELT MORRIS.